Feb. 18, 1941.    R. F. THORNTON    2,231,968
AXLE COMPENSATOR
Filed Sept. 21, 1938    3 Sheets-Sheet 1

INVENTOR.
Ray F. Thornton
BY Dike, Calver & Gray
ATTORNEY.

Feb. 18, 1941.  R. F. THORNTON  2,231,968
AXLE COMPENSATOR
Filed Sept. 21, 1938   3 Sheets-Sheet 2
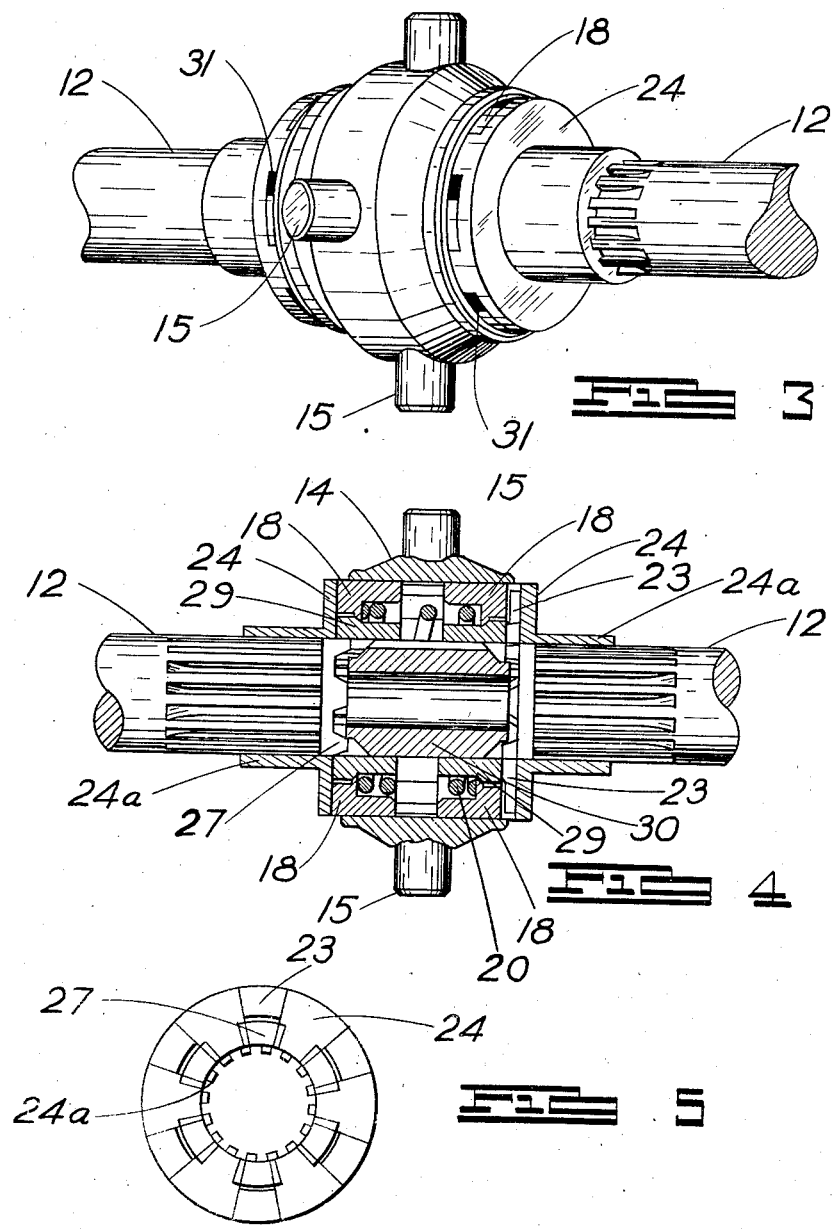
INVENTOR.
Ray F. Thornton
BY Dike, Calver & Gray
ATTORNEY.

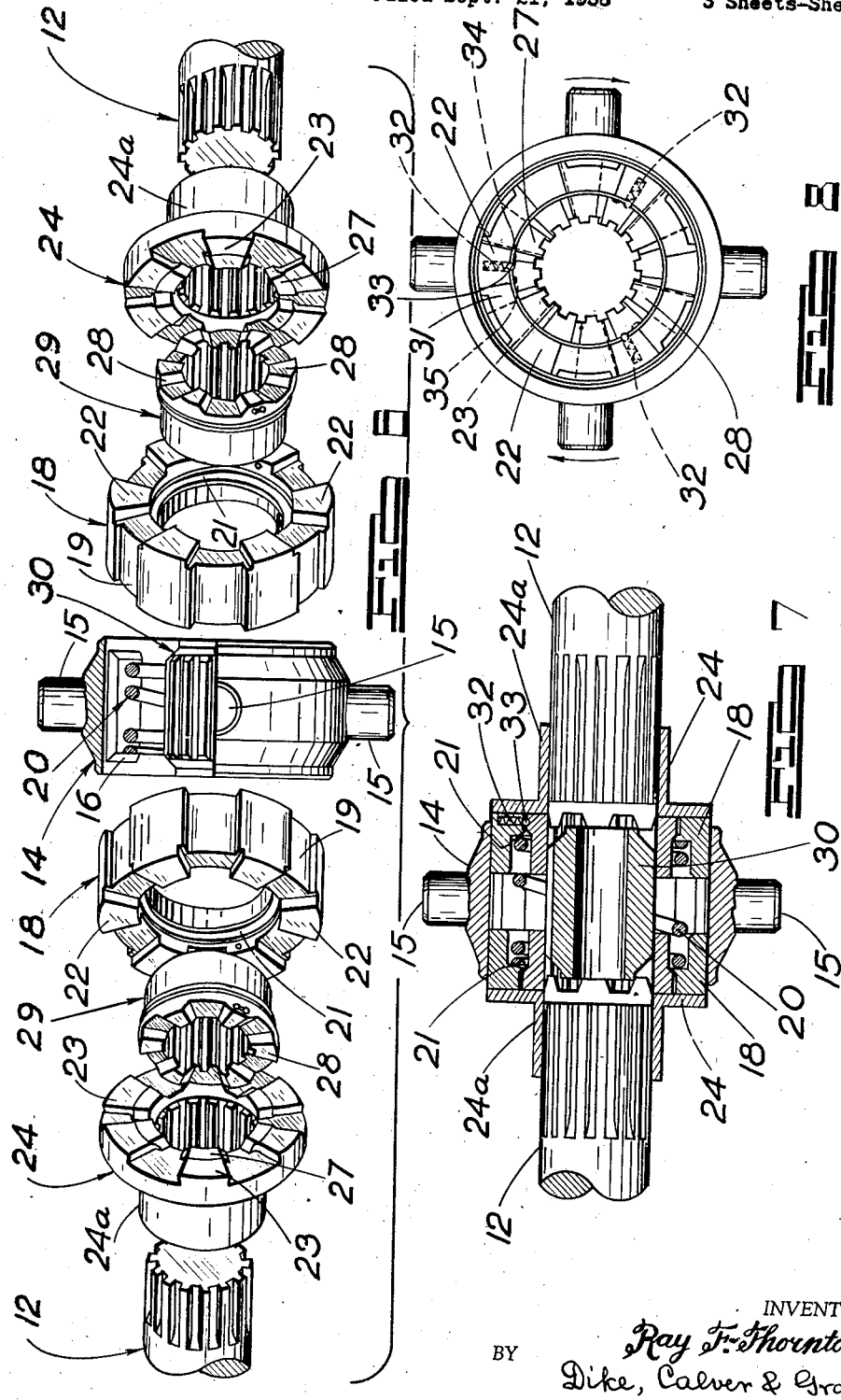
Feb. 18, 1941.  R. F. THORNTON  2,231,968
AXLE COMPENSATOR
Filed Sept. 21, 1938  3 Sheets-Sheet 3
INVENTOR.
Ray F. Thornton
BY Dike, Calver & Gray
ATTORNEY.

Patented Feb. 18, 1941

2,231,968

UNITED STATES PATENT OFFICE 2,231,968

AXLE COMPENSATOR

Ray F. Thornton, Dexter, Mich., assignor to C. F. Gobright, Inc., Detroit, Mich., a corporation of Michigan Application September 21, 1938, Serial No. 230,957

12 Claims. (Cl. 74—389.5)

This invention relates to axle compensators and more particularly, although not exclusively, to an axle compensator adapted for use in structures such as land vehicles, particularly motor vehicles.

One of the objects of the present invention is to provide an improved axle compensator which may be used in a motor vehicle instead of a conventional differential device, and which allows one of the shafts and its connected driving wheel to run ahead of the other shaft and its connected driving wheel.

Another object of the invention is to provide an axle compensator for use in a motor vehicle, which ensures transmission of driving torque to at least one wheel under all road conditions. It is commonly known that one of the most serious disadvantages of conventional differential devices is the possibility of spinning of one wheel with no driving torque delivered to the other wheel. This condition frequently causes stalling of motor vehicles as for example when one of the driving wheels is free to spin whenever its frictional engagement with the road surface is lost by contact for example with ice, sand or mud.

Still another object of the invention is to provide an improved compensator device for vehicles, which enables starting of a vehicle even if one of the driving wheels is not in sufficient frictional contact with the road surface to permit it to transmit a driving force to the vehicle. It is known that starting of vehicles equipped with conventional differential devices is impossible except when each driving wheel is able to deliver sufficient driving force to the vehicle. This is not possible if one wheel is more free to revolve than the other wheel connected with the differential mechanism.

A further object of the invention is to provide an axle compensator in which means are provided whereby positive driving engagement of one of the half-axles with the ring gear is not affected by the disengagement of the other half-axle therefrom. With the axle compensators of the known types intended for similar use, disengagement of one half-axle affects adversely the operative engagement of the other half-axle, and this is very objectionable from the standpoint of safety and smooth operation.

Still another object of the invention is to provide an improved axle compensator which prevents dangerous spinning of either driving wheel such as may occur during high speed operation of a vehicle, as for example when a driving wheel runs off a hard surfaced road and contacts the soft shoulder of the highway.

It is an added object of the present invention to provide an improved axle compensator possessing the foregoing and other desirable characteristics which is simple in construction, dependable in operation, and is relatively inexpensive to manufacture and repair, and which may be readily installed in existing constructions as a replacement for the conventional gear type of differential.

Other objects of this invention will appear in the following description and appended claims, reference being had to the accompanying drawings forming a part of this specification wherein like reference characters designate corresponding parts in the several views.

Fig. 3 is a perspective view of the axle compensator embodying the present invention and connecting two half-axles or shafts, the differential casing being removed.

Fig. 4 is a longitudinal section of the structure shown in Fig. 3, the right-hand clutch being shown disengaged.

Fig. 5 is an end view of one of the clutch driven members.

Fig. 6 is an exploded view showing the operative parts of the axle compensator in perspective.

Fig. 7 is a view similar in part to Fig. 4, both clutches being shown engaged.

Fig. 8 is an end view of the axle compensator looking from the right-hand side thereof, with the right-hand side half-axle and the clutch driven member normally connected thereto removed.

Figure 1:
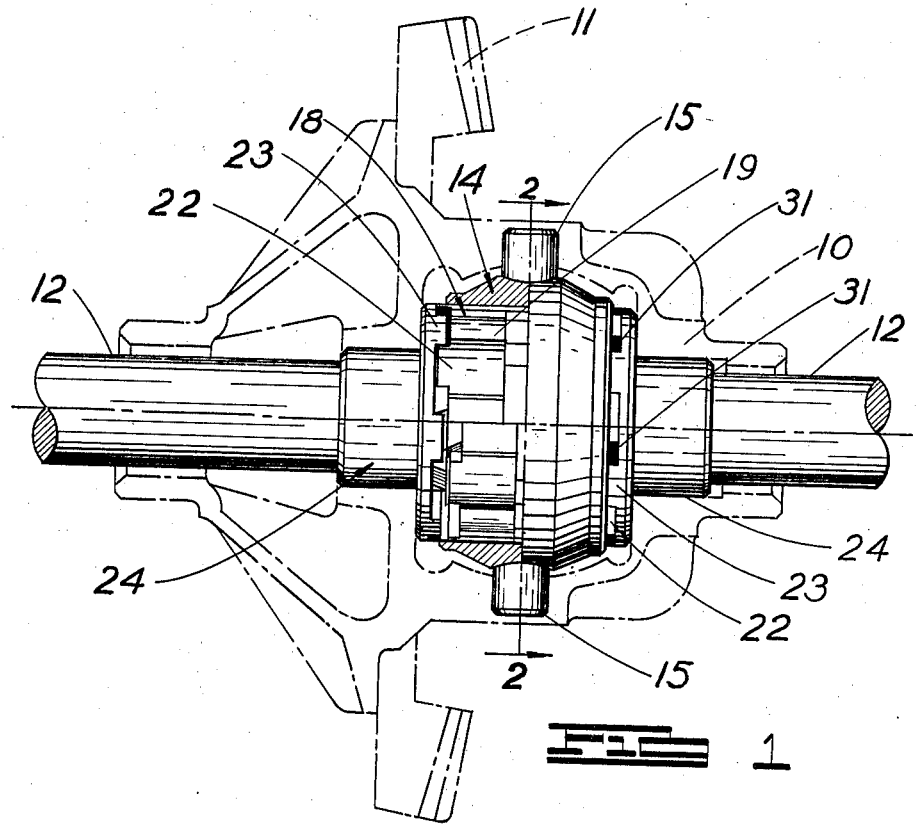
Fig. 1 is a view, partly in section, of the axle compensator embodying the present invention, the ring gear and the differential housing of a conventional design being shown in dotted lines.
Figure 2:
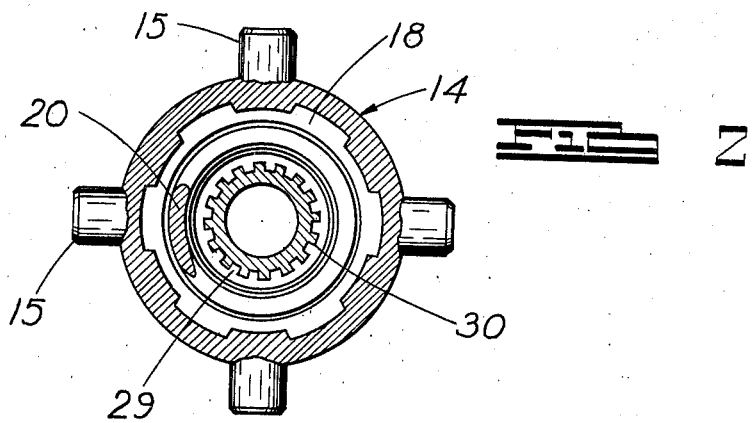
Fig. 2 is a sectional view taken in the direction of the arrows on the vertical transverse plane passing through the line 2—2 of Fig. 1.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, an axle compensator such as may be used for motor vehicles in place of a conventional differential. It will be understood, however, that the compensator device of my invention may be used in other connections such, for instance, as for operatively connecting two opposed shafts, transmitting power to said shafts from a single source and permitting one shaft to run ahead of the other.

The device embodying the present invention comprises generally: first, two clutches, preferably of the jaw type, driven preferably from a single source, each of said clutches being connected to the end of one of the opposed shafts; and second, means operated by the axle which tends to turn faster than the other axle, with the aid of which the clutch connected to such faster rotating axle is disengaged, permitting said axle to run freely ahead of the other axle. The arrangement of the operative parts of my improved device is such that disengagement of one of the clutches produces a more firm engagement of the other clutch and thus permits the driving torque to be transmitted to the more slowly rotating axle.

Fig. 1 illustrates an axle compensator constructed with one embodiment of the present invention, operatively mounted within a differential casing 10 to which is secured in a manner well known in the art a ring gear 11. The compensator connects two opposed or substantially abutting half-axles or shafts 12. The casing 10 and the ring gear 11 are of conventional designs and dimensions, while the compensator device of my invention is made of such dimensions as to fit interchangeably within said casing, by virtue whereof my axle compensator device may be installed within a conventional vehicle by removing the conventional differential therefrom and installing my improved axle compensator. The above feature of interchangeability with devices of conventional construction is a very important advantage of my improved device.

The axle compensator illustrated in the drawings is symmetrical on both sides of a plane passing through its center and, therefore, for the sake of simplicity of the following description the same numerals will be assigned to the similar parts of the compensator if two of them are provided in the compensator, one on each side of said plane. Whenever it becomes necessary to distinguish between such similar parts as to the mode of their operation, they will be distinguished by the reference to the right-hand side or the left-hand side of the compensator considering the above mentioned plane as a division plane.

Referring to the drawings, the compensator device illustrated therein comprises a driver member, in the present embodiment a driving spider 14 provided with a plurality, in the present instance four, of lugs 15 with the aid of which the spider is drivingly connected with the differential housing 10. The driving spider 14 is generally in the form of a wide ring, and it is internally splined on its inner cylindrical surface as is shown at 16.

Within the driving spider 14 there are slidably fitted two clutch driving members 18 provided on their outside cylindrical surfaces with external splinings as is indicated at 19. The members 18 are slidable within the driving spider 14 in the longitudinal or axial direction, that is to say, along the coinciding axes of the spider 14, members 18 and axles 12.

A spring 20 is arranged between the clutch driving members 18. The spring is of the compression type and it bears upon the shoulders 21 provided on the members 18. The spring 20 tends to force the members 18 outwardly, that is, away from the center of the compensator, thereby keeping teeth 22 provided on the outward ends of the clutch driving members 18 in mesh with clutch teeth 23 provided on clutch driven members 24.

The clutch driven members 24 are provided with internally splined extensions 24a and may be pressed on the externally splined ends of the half-axles 12. It is to be noted that the members 24 do not slide on the half-axles 12, particularly in the outward axial direction, although they may be removed from said axles when the device is being disassembled. The same effect may be produced by causing the members 24 to bear against the walls of the housing or differential casing 10.

It will now be clear in view of the foregoing that when the ring gear 11 is rotated from the vehicle engine, the power is transmitted by said gear to the differential casing 10 and therefrom to the lugs 15 of the driving spider 14. Because of the splining connection between the spider 14 and the clutch driving members 18, said members 18 will also be rotated. Due to the engagement of the clutch teeth 23 and 24, the members 18 drive the clutch driven members 24, which members in turn drive the half-axles 12. Thus, the driving connection between the ring gear 11 and the half-axles 12 is of a positive nature, and if power is applied to said gear 11, both half-axles will be driven because of said positive driving connection. Such driving of the axles by the ring gear 11 is not affected by any parts of the compensator as long as power is applied to the ring gear 11 and the vehicle travels along a straight path either forward or backward.

By virtue of the above described construction there are provided, in effect, in my improved compensator two tooth or jaw clutches, one for each of the two opposed shafts or half-axles 12, each of said clutches comprising a driving member 18 and a driven member 24, the driving members being positively connected for rotation by means of the spider member 14 and the differential casing 10 to the ring gear 11. Engagement of said clutches is effected by means of the spring 20 which pushes the driving members 18, slidable longitudinally in the spider 14, outwardly into engagement with the driven members 24.

In accordance with the invention there are provided in my compensator improved means whereby either of the above described clutches is disengaged by the operation of the corresponding half-axle 12 when the same begins to run ahead of the other half-axle in either direction of rotation. With the forward motion of the vehicle and power being transmitted from the engine to the driving wheels, this condition may be termed as one under which the clutch driven member tends to drive. In the present embodiment of the invention, said means are exemplified by the cam teeth 27 provided on the clutch driven members 24, which teeth mesh with similar cam teeth 28 provided on clutch disengaging members 29 made in the form of internally splined sleeves rotatably fitted in the clutch driving members 18 and having shoulders bearing upon the shoulders 21 of the members 18 from the side opposite to the spring 20. The cam teeth 27 and 28 are slanted on their sides on an angle relatively small, such for instance as 30 degrees, and therefore if such torque as results from the difference in the speeds of rotation of the shafts is applied to the driving member 24, instead of transmitting rotation to the clutch disengaging member 29, the action of the meshing cam teeth 27 and 28 operates to push the clutch disengaging member 29 and the clutch driving member 18 inwardly or toward the center of the compensator device against the resistance of the spring 20, thereby disengaging the clutch teeth 22 and 23 and permitting rotation of the clutch driven member 24 independently of the clutch driving member 18.

The above described condition is illustrated in Fig. 4, wherein the right-hand clutch of the compensator is shown disengaged, permitting the right-hand side half-axle 12 to rotate faster than the left-hand half-axle is rotating at the moment. By virtue of such operation, the right-hand driving wheel of the vehicle may run faster than the left-hand driving wheel, thereby permitting the vehicle to make a left-hand turn without objectionable slippage of the driving wheels on the road. As commonly known, in following a curve, the outside wheel of a vehicle has to cover a longer path than is covered by the inside wheel of the vehicle.

The clutch disengaging members 29 are connected for rotation by means of an externally splined connecting sleeve 30 and, therefore, in the condition illustrated in Fig. 4 the left-hand side half-axle 12 and the entire compensator device including both clutch driving and both clutch disengaging members rotate together, and it is only the right-hand side half-axle and the driven clutch member connected thereto that are rotating separately. From an examination of Fig. 4 it can be easily understood that the power received by the lugs 15 of the driving spider 14 is transmitted to the left-hand side half-axle 12 by a positive driving connection, and therefore the left-hand wheel which is connected to the left-hand half-axle 12 receives the necessary driving power. In a continuous operation over a curve with the operative positions of the parts shown in Fig. 4, the left-hand axle will receive the power from the ring gear, while the right-hand side axle 12 indexes or "clicks" from cam tooth to cam tooth until the vehicle reaches the straight path. Thereupon, when the disengaging operation of the cam teeth ceases and the right-hand clutch driven member ceases to run ahead of the clutch driving member 18, the spring 20 pushes the clutch driving member 18 into engagement with the clutch driven member 24. The condition in which both clutches are fully engaged and both half-axles 12 are driving at the same speed is illustrated in Fig. 7.

Should the left-hand half-axle 12 begin to rotate faster than the right-hand half-axle, it will become disengaged from the left-hand clutch driving member 18 in exactly the same manner as was described above with respect to disengagement of the right-hand half-axle.

It is an important advantage of the present invention that disengagement of either of the clutches does not affect adversely the secure engagement of the remaining clutch. From an examination of Fig. 4, it can be clearly seen that when the right-hand clutch is disengaged, the spring 20 is still more compressed and it exerts a greater force on the left-hand clutch driving member 18, whereby a still more secure engagement of the left-hand clutch is attained. As noted above, the clutch driven members 24 and the half-axles 12 rigidly connected thereto do not slide in the axial direction.

It is to be noted that in order to permit disengaging operation of the cam teeth there must be permitted a certain amount of free rotation of the clutch driven member in the driving direction. Fig. 8 illustrates this requirement by showing positions of the teeth 23 of the clutch driven member in dotted lines in the recesses between the teeth 22 of the clutch driving member 18. As can be clearly seen in said figure there is a clearance 31 between the teeth 23 and 22 and, therefore, the teeth 23 when tending to run ahead of the teeth 22 may move in the driving direction, that is, clockwise in Fig. 8, until said space 31 is consumed. By that time the cam teeth 27 have climbed on the cam teeth 28 and the clutch is disengaged. It will be observed that there is no power driving the clutch tooth at the instant of the disengagement of such tooth. The rotation of the clutch driven member ahead of the clutch driving member continues with the unmeshed clutch teeth and the top flats 27a and 28a of the cam teeth 27 and 28 bearing one upon the other. Such rotation of the clutch driven member 24 continues until the cam teeth come into mesh again, which also brings the clutch teeth 22 and 23 in operative engagement. This results in the clutch teeth being in positive driving engagement at all times when driving torque is applied thereto.

In order to permit a similar operation of my improved compensator when the vehicle is operating in reverse gear, means are provided which permit rotation of the clutch disengaging members 24 relative to the clutch driving members 18 for a distance sufficient to consume the clearance space 31 thus forming a similar clearance space on the other side of the driven tooth 23. Said means also provide a stop for said clutch driven members 24 at that point.

In the present embodiment of the invention said means are exemplified by a spring-and-ball device provided in the clutch driving members 18. Referring to Figs. 7 and 8, said device comprises a spring 32 mounted within a hole drilled in the clutch driving member from the center thereof outwardly, the outward opening of said hole being closed in any suitable manner to provide a support for the spring 32. The spring 32 bears upon a ball 33, which ball is prevented from falling out of the hole by peening the metal around the edges of the hole. The ball 33 cooperates with two indentations 34 and 35 formed on the clutch disengaging member 24. By virtue of such a construction there is provided a certain resistance to the relative rotation of the members 18 and 24, which rotation is, however, easily overcome by the clutch driving member 18 when the same is being driven by the engine. As soon as the ball 33 gets into the indentation 35 a positive stop is provided and a further relative rotation of the members 18 and 24 is prevented. In this position of the operative parts the compensator device operates as described above with reference to the forward operation of the vehicle. When the gears are shifted for the forward operation of the vehicle, the rotation of the clutch driving member 18 brings the ball 33 into the indentation 34 and the device again operates as described.

When the vehicle is coasting and the inertia of the vehicle tends to drive the engine which begins to act as a braking device, the resisting torque of the engine causes the driving spider 14 to move relatively to the clutch driven member 24 and the clutch disengaging member 29, in consequence whereof the clearance space 31 is taken up, just as in the above described case of reversal of the gears. Under such conditions the outside wheel is positively connected with the engine, while the inside wheel is disconnected therefrom and is permitted to run slower than the outside wheel.

Thus, considered from one of its broader aspects, my invention contemplates providing an improved axle compensator for motor vehicles which permits one of the driving wheels to run ahead of the other, in which compensator there are provided means whereby such free rotation of one of the wheels does not interfere with the transmission of power from the engine to the other driving wheel, the device providing a positive driving connection between the source of driving torque and said other driving wheel.

I claim:

1. In an axle compensator for a vehicle having two opposed axle shafts, a final drive gear and a housing secured thereto; a spider drivingly mounted within said housing, two driving clutch members longitudinally slidable within said spider and drivingly connected thereto, two driven clutch members drivingly mounted on the ends of said two axle shafts respectively, a spring operatively mounted between said driving clutch members, said spring adapted to push the driving clutch members outwardly into driving engagement with said driven clutch members, two clutch disengaging members bearing respectively upon the two driving clutch members, and adapted to be pushed separately inwards of the compensator against the resistance of said spring when one of the driven clutch members tends to drive while transmission of rotative effort takes place between said final drive gear and said axle shafts, thereby pushing the corresponding driving clutch member away from such driven clutch member.

2. In an axle compensator for a vehicle having two opposed axle shafts, a final drive gear and a housing secured thereto; a spider drivingly mounted within said housing, two driving clutch members longitudinally slidable within said spider and drivingly connected thereto, two driven clutch members drivingly mounted on the ends of said two axle shafts respectively and fixed in the outward direction, and a spring operatively mounted between said driving clutch members, said spring adapted to push the driving clutch members outwardly into driving engagement with said driven clutch members, a plurality of cam teeth on the clutch driven members, two clutch disengaging members each bearing on one of said driving clutch members, a corresponding plurality of cam teeth on said clutch disengaging members adapted to mesh with the cam teeth of the driven clutch members, each of said clutch disengaging members being adapted to be pushed separately inwards of the compensator by the interaction of said meshing cam teeth when the clutch driven member tends to drive through said cam teeth, whereby the corresponding driving clutch member is pushed away from such tending-to-drive clutch driven member.

3. In an axle compensator for a vehicle having two opposed axle shafts, a final drive gear and a housing secured thereto; a spider drivingly mounted within said housing, two driving clutch members longitudinally slidable within said spider and drivingly connected thereto, two driven clutch members drivingly mounted on the ends of said two axle shafts respectively and fixed in the outward direction, and a spring operatively mounted between said driving clutch members, said spring adapted to push the driving clutch members outwardly into driving engagement with said driven clutch members, a plurality of cam teeth provided on the clutch driven members inwardly of the clutch engaging portion thereof, two clutch disengaging members, each located within one of the driving clutch members and bearing upon the same in the inward axial direction, a corresponding plurality of cam teeth on said clutch disengaging members adapted to mesh with the cam teeth of the driven clutch members, each of said clutch disengaging members being adapted to be pushed separately inwards of the compensator by the interaction of said meshing cam teeth when the clutch driven member tends to drive through said cam teeth, whereby the corresponding driving clutch member is pushed away from such tending-to-drive clutch driven member.

4. In a compensator for connecting two opposed shafts capable of overrunning each other, two clutches each having a driving member and a driven member, cam means operated by the overrunning shaft and operating to disengage said clutches, means for connecting said driving clutch members with a source of power independently of said cam means, said driving clutch members being adapted to move toward the center of the compensator for disengagement of the clutches.

5. In a compensator for connecting two opposed shafts capable of overrunning each other, two jaw-type clutches, each of said clutches having a driving member and a driven member, said driven members being drivingly mounted on the respective opposed ends of said shafts, cam means operated by the overrunning shaft and operating to disengage said clutches, means for connecting said driving clutch members with a source of power independently of said cam means, and said driving members being adapted to move away from said driven members for disengagement of the clutches.

6. In an axle compensator for operatively connecting two aligned axles capable of overrunning each other, two jaw-type clutches, each of said clutches having a driving member and a driven member, said driven members being drivingly mounted on the opposed ends of said axles and made stationary in the outward axial direction, cam means operated by the overrunning shaft and operating to disengage said clutches, means for connecting said driving clutch members with a source of power independently of said cam means, and said driving members being arranged between said driven members and movable toward the center of the compensator for their disengagement from said driven members.

7. In an axle compensator for operatively connecting two aligned axles, two jaw clutches, each having a driving member and a driven member, said driven members being drivingly mounted respectively on the opposing ends of said axles and anchored thereon in the axial direction, and said driving members being arranged between said driven members and movable toward each other for their disengagement from said driven members; two clutch disengaging members journaled within said driving members; means connecting said driving members to said clutch disengaging members for the movements in the axial directions; and a spring arranged between said driving clutch members and adapted to force said members outwardly into engagement with said clutch driven members.

8. In an axle compensator for operatively connecting two aligned axles, two jaw clutches, each having a driving member and a driven member, said driven members being drivingly mounted respectively on the opposing ends of said axles and anchored thereon in the outward axial direction, and said driving members being arranged between said driven members and movable toward each other for their disengagement from said driven members; two clutch disengaging members journaled within said driving members; means connecting said driving members to said clutch disengaging members for the movements in the axial directions; and a spring arranged between said driving clutch members and adapted to force said members outwardly into engagement with said clutch driven members, cam means provided on said driven clutch members and said clutch disengaging members, said cam means adapted to move a clutch disengaging member inwardly of the compensator when the clutch driven member on the side of said disengaging member tends to drive through said cam means.

9. In an axle compensator for operatively connecting two aligned axles, two jaw clutches, each having a driving member and a driven member, said driven members being drivingly mounted respectively on the opposing ends of said axles and anchored thereon in the outward axial direction, and said driving members being arranged between said driven members and movable toward each other for their disengagement from said driven members; two clutch disengaging members journaled within said driving members; means connecting said driving members to said clutch disengaging members for the movements in the axial directions; and a spring arranged between said driving clutch members and adapted to force said members outwardly into engagement with said clutch driven members, cam means provided on said driven clutch members and said clutch disengaging members, said cam means adapted to move a clutch disengaging member inwardly of the compensator when the clutch driven member on the side of said disengaging member tends to drive through said cam means, said clutches having lost motion between their meshing jaws to allow motion of the driven members sufficient to operate the cam means.

10. In an axle compensator for operatively connecting two aligned axles, two jaw clutches, each having a driving member and a driven member, said driven members being drivingly mounted respectively on the opposing ends of said axles and anchored thereon in the outward axial direction, and said driving members being arranged between said driven members and movable toward each other for their disengagement from said driven members; two clutch disengaging members journaled within said driving members; means connecting said driving members to said clutch disengaging members for the movements in the axial directions; and a spring arranged between said driving clutch members and adapted to force said members outwardly into engagement with said clutch driven members, a plurality of cam teeth on said driven clutch members and a corresponding plurality of cam teeth on said clutch disengaging members, said teeth being in mesh and adapted to move a clutch disengaging member inwardly of the compensator when the driven clutch member meshing therewith tends to drive through said cam teeth, the lost motion in the clutches being sufficient to allow rotative motion of the driven members to effect complete disengagement of the clutches.

11. A structure defined by the preceding claim 10 and including means whereby each of the clutch disengaging members may be turned with respect to the driving member within which it is arranged substantially for a distance of the lost motion between the teeth of said clutches.

12. A structure defined by the preceding claim 10 and including ball and spring means whereby each of the clutch disengaging members may be turned with respect to the driving member within which it is arranged substantially for a distance of the lost motion between the teeth of said clutches.

RAY F. THORNTON.